US008954295B1

(12) United States Patent
Vicknair et al.

(10) Patent No.: US 8,954,295 B1
(45) Date of Patent: Feb. 10, 2015

(54) DETERMINING AN OUTER SHELL OF A COMPOSITE THREE-DIMENSIONAL MODEL

(75) Inventors: Dwight D. Vicknair, Longmont, CO (US); John E. Ulmer, Boulder, CO (US)

(73) Assignee: Trimble Navigation Limited, Sunnyvale, CA (US)

( * ) Notice: Subject to any disclaimer, the term of this patent is extended or adjusted under 35 U.S.C. 154(b) by 800 days.

(21) Appl. No.: 13/207,052

(22) Filed: Aug. 10, 2011

(51) Int. Cl.
*G06F 17/50* (2006.01)
*G06T 19/00* (2011.01)

(52) U.S. Cl.
CPC ............. *G06F 17/50* (2013.01); *G06T 19/00* (2013.01)
USPC .......................................................... 703/1

(58) Field of Classification Search
CPC . G06F 17/50; G06F 17/5004; G06F 17/5018; G06F 17/5095; G06T 19/00
USPC .......................................................... 703/1
See application file for complete search history.

(56) References Cited

U.S. PATENT DOCUMENTS

| 5,596,504 | A  | * | 1/1997  | Tata et al. ............... 700/120 |
| 6,628,279 | B1 | * | 9/2003  | Schell et al. ............ 345/420 |
| 7,629,973 | B2 |   | 12/2009 | Oh et al. |
| 7,734,059 | B2 |   | 6/2010  | Kase et al. |
| 7,812,837 | B2 |   | 10/2010 | Naoi |
| 7,813,301 | B2 |   | 10/2010 | Yeh et al. |
| 7,903,108 | B2 |   | 3/2011  | Jacobson |

* cited by examiner

*Primary Examiner* — Saif Alhija
(74) *Attorney, Agent, or Firm* — Sheridan Ross P.C.

(57) ABSTRACT

In a computer-implemented method of determining an outer shell of a composite three-dimensional model, an indication of a plurality of initial faces of the composite three-dimensional model is received. A plurality of intersections between the plurality of initial faces is determined. A plurality of split faces is generated by splitting each of the plurality of initial faces that intersects another one or more of the plurality of initial faces into two or more split faces along one or more lines of intersection. It is determined whether each of the plurality of split faces and each of the plurality of initial faces that does not intersect another one or more of the plurality of initial faces corresponds to the outer shell or to an interior portion of the composite three-dimensional model.

24 Claims, 9 Drawing Sheets

DETERMINING AN OUTER SHELL OF A COMPOSITE THREE-DIMENSIONAL MODEL

FIELD OF TECHNOLOGY

The present disclosure relates generally to a three-dimensional modeling application and, more particularly, to determining an outer shell of a composite three-dimensional model in a three-dimensional modeling application.

BACKGROUND

Three-dimensional modeling applications provided by computer-aided design systems may allow a user to create models of buildings, terrain, and other three-dimensional objects. For example, a three-dimensional modeling application may allow a user to construct a model of a building that includes each room within the building. The user may construct such a model in any of a number of suitable manners, including constructing the model as a composite model that includes a plurality of three-dimensional objects. In the case of a model of a building that includes each room within the building, the user may model each room of the building using an appropriate "primitive" such as a three-dimensional solid.

In some cases, a composite three-dimensional model may also or alternatively include one or more other types of "primitives," such as cylinders, cones, etc. Additionally, in some cases, one or more portions of a composite three-dimensional model may include more complex three-dimensional objects. Still further, in some cases, a composite three-dimensional model may be created entirely or partially from three-dimensional objects, two-dimensional objects, or a suitable combination thereof that were created using a different modeling application. For example, the composite three-dimensional model may include one or more three-dimensional objects that were created using a legacy three-dimensional modeling application and then imported into the three-dimensional modeling application currently in use. In some cases, a legacy modeling application may have been used to create one or more parametric definitions of three-dimensional objects, which may then be imported into the three-dimensional modeling application currently in use in order to generate a composite three-dimensional model that includes the defined three-dimensional objects.

In any event, in many cases when a composite three-dimensional model is created from a plurality of three-dimensional objects, the composite three-dimensional model will include both exterior geometry and interior geometry, such as interior faces, edges, vertices, etc. Depending upon the purpose of the composite three-dimensional model and the context in which the composite three-dimensional model is used, a user of the three-dimensional modeling application may not need to see or manipulate the interior geometry of the composite three-dimensional model. For example, the composite three-dimensional model may be inserted, by way of the three-dimensional modeling application, into a map of a particular geographic area, and users of the map may only need or wish to view and/or manipulate the exterior of the composite three-dimensional model in the context of the map. Nevertheless, the three-dimensional modeling application may require a significant amount of computational resources for rendering the interior geometry of the composite three-dimensional model. Similarly, the definitions of interior geometry in the composite three-dimensional model may significantly contribute to the amount of computational resources required by the three-dimensional modeling application in order to process user manipulations to the composite three-dimensional model.

SUMMARY

In one embodiment, a computer-implemented method of determining an outer shell of a composite three-dimensional model includes receiving, using a computing device, an indication of a plurality of initial faces of the composite three-dimensional model. The method also includes determining, using the computing device, a plurality of intersections between the plurality of initial faces of the composite three-dimensional model. The method additionally includes generating, using the computing device, a plurality of split faces by splitting each of the plurality of initial faces that intersects another one or more of the plurality of initial faces into two or more split faces along one or more lines of intersection between the initial face and the other one or more of the plurality of initial faces. The method further includes determining, using the computing device, whether each of the plurality of split faces and each of the plurality of initial faces that does not intersect another one or more of the plurality of initial faces corresponds to the outer shell of the composite three-dimensional model or to an interior portion of the composite three-dimensional model.

If desired, determining the plurality of intersections between the plurality of initial faces may include sorting a plurality of three-dimensional objects of the composite three-dimensional model according to a minimum coordinate associated with each of the plurality of three-dimensional objects. Each of the plurality of three-dimensional objects may include a subset of the plurality of initial faces of the composite three-dimensional model. In this example, determining the plurality of intersections between the plurality of initial faces may further include determining a plurality of pairs of the plurality of three-dimensional objects based on the sorting of the plurality of three-dimensional objects, and determining, for each pair of the plurality of three-dimensional objects, whether any of the initial faces of a first three-dimensional object of the pair intersect any of the initial faces of a second three-dimensional object of the pair.

In some cases, determining whether each of the plurality of split faces and each of the plurality of initial faces that does not intersect another one or more of the plurality of initial faces corresponds to the outer shell of the composite three-dimensional model or to the interior portion of the composite three-dimensional model includes identifying a portion of the outer shell based on identifying one of the plurality of split faces or one of the plurality of initial faces that, of one or more faces having a highest coordinate along one of a plurality of coordinate axes, is a face most normal to the one coordinate axis. In this example, the method may include determining a further one of the plurality of split faces or a further one of the plurality of initial faces that shares a first boundary edge with the identified portion of the outer shell and that corresponds to the outer shell based on an angle between the identified portion of the outer shell and the further one of the plurality of split faces or the further one of the plurality of initial faces. The method may also include removing, from the composite three-dimensional model, one or more other faces that share the first boundary edge with the identified portion of the outer shell. The method may additionally include updating the identified portion of the outer shell based on the determining of the further one of the plurality of split faces or the further one of the plurality of initial faces that corresponds to the outer shell. The method may additionally include identifying a further boundary edge of the identified portion of the outer shell after updating the identified portion of the outer shell. The method may further include repeating the determining of a further one of the plurality of split faces or a further one of the plurality of initial faces that corresponds to the outer shell, the updating of the identified portion of the outer shell, and the identifying of a further boundary edge of the identified portion of the outer shell until no boundary edge remains between the identified portion of the outer shell and any further one of the plurality of split faces and the plurality of initial faces.

If desired, identifying the portion of the outer shell may include identifying the portion of the outer shell as the one of the plurality of split faces or the one of the plurality of initial faces that, of the one or more faces having the highest coordinate along the one coordinate axis, is the face most normal to the one coordinate axis. In another example, identifying the portion of the outer shell may include identifying, as being included in the portion of the outer shell, the one of the plurality of split faces or the one of the plurality of initial faces that, of the one or more faces having the highest coordinate along the one coordinate axis, is the face most normal to the one coordinate axis. In this example, identifying the portion of the outer shell may further include identifying, as being included in the portion of the outer shell, one or more additional ones of the plurality of split faces and the plurality of initial faces, wherein each of one or more boundary edges between the faces identified as being included in the portion of the outer shell bounds only two of the faces identified as being included in the portion of the outer shell.

If desired, the method may further include determining whether the one of the plurality of split faces or the one of the plurality of initial faces that, of the one or more faces having the highest coordinate along the one coordinate axis, is the face most normal to the one coordinate axis, is oriented in a positive direction with respect to the one coordinate axis or a negative direction with respect to the one coordinate axis. In this example, the method may further include reversing the orientation of the one of the plurality of split faces or the one of the plurality of initial faces when it is determined that the orientation of the one of the plurality of split faces or the one of the plurality of initial faces is in the positive direction with respect to the one coordinate axis. The method may also include determining an orientation of each further one of the plurality of split faces or the plurality of initial faces that is determined to correspond to the outer shell. In this example, the method may additionally include reversing the orientation of each further one of the plurality of split faces or the plurality of initial faces that is determined to correspond to the outer shell when it is determined that the orientation of the further one of the plurality of split faces or the plurality of initial faces is inconsistent with the orientation of the one of the plurality of split faces or the one of the plurality of initial faces.

In another embodiment, a computer-implemented method for use in determining an outer shell of a composite three-dimensional model comprising a plurality of faces includes identifying, using a computing device, a first subset of the plurality of faces that share a common boundary edge. The method also includes determining, using the computing device, two of the first subset of the plurality of faces that correspond to the outer shell of the composite three-dimensional model based on an angle between the two of the first subset of the plurality of faces. The method further includes removing, using the computing device, at least one other one of the first subset of the plurality of faces from the composite three-dimensional model based on determining that the two of the first subset of the plurality of faces correspond to the outer shell of the composite three-dimensional model.

If desired, the method may also include identifying one or more further subsets of the plurality of faces that share one or more respective further common boundary edges. The method may further include determining, for each further subset of the plurality of faces, one face of the further subset that corresponds to the outer shell of the composite three-dimensional model based on an angle between the one face of the further subset and one of the plurality of faces previously determined to correspond to the outer shell of the composite three-dimensional model.

In some examples, identifying the first subset of the plurality of faces that share the common boundary edge may include identifying a first face of the first subset based on identifying one of the plurality of faces that, of one or more of the plurality of faces having a highest coordinate along one of a plurality of coordinate axes, is a face most normal to the one coordinate axis. Identifying the first subset of the plurality of faces that share the common boundary edge may additionally include identifying, as part of the first subset, at least two of the plurality of faces that share the common boundary edge with the first face of the first subset.

If desired, the method may also include identifying a sheet including the one of the plurality of faces that, of the one or more of the plurality of faces having the highest coordinate along the one coordinate axis, is the face most normal to the one coordinate axis. The sheet may further include one or more additional ones of the plurality of faces such that each of one or more boundary edges between faces of the sheet bounds only two faces of the sheet. Additionally, in this example, identifying the first face of the first subset may include identifying a face of the sheet including at least a portion of an edge of the sheet, wherein the at least the portion of the edge of the sheet is the common boundary edge. Furthermore, in this example, determining the two of the first subset of the plurality of faces that correspond to the outer shell may include determining that the first face of the first subset corresponds to the outer shell. Determining the two of the first subset of the plurality of faces that correspond to the outer shell may also include determining that a second face of the first subset corresponds to the outer shell by determining that an exterior angle between the first face and the second face is smaller than one or more exterior angles between one or more respective other pairs of the first subset of the plurality of faces.

In some example, the plurality of faces of the composite three-dimensional model is a plurality of updated faces, and the method may include identifying the plurality of updated faces by determining a plurality of intersections between a plurality of initial faces of the composite three-dimensional model. The method may additionally include dividing each of the plurality of initial faces that intersects one or more other ones of the plurality of initial faces into two or more faces of the plurality of updated faces by splitting the initial face along one or more lines of intersection between the initial face and the one or more other ones of the plurality of initial faces. The method may further include including, in the plurality of updated faces, each of the plurality of initial faces that does not intersect another one or more of the plurality of initial faces.

In yet another embodiment, a tangible non-transitory computer-readable medium has instructions stored thereon that, when executed by one or more processors, cause the one or more processors to receive an indication of a plurality of initial faces of a composite three-dimensional model. The instructions, when executed by the one or more processors, also cause the one or more processors to determine a plurality of intersections between the plurality of initial faces of the composite three-dimensional model. The instructions, when executed by the one or more processors, additionally cause the one or more processors to generate a plurality of split faces by splitting each of the plurality of initial faces that intersects another one or more of the plurality of initial faces into two or more split faces along one or more lines of intersection between the initial face and the other one or more of the plurality of initial faces. The instructions, when executed by the one or more processors, further cause the one or more processors to determine whether each of the plurality of split faces and each of the plurality of initial faces that does not intersect another one or more of the plurality of initial faces corresponds to an outer shell of the composite three-dimensional model or to an interior portion of the composite three-dimensional model.

In still another embodiment, a tangible non-transitory computer-readable medium has instructions stored thereon that, when executed by one or more processors, cause the one or more processors to identify a first subset of a plurality of faces of a composite three-dimensional model that share a common boundary edge. The instructions, when executed by the one or more processors, also cause the one or more processors to determine two of the first subset of the plurality of faces that correspond to an outer shell of the composite three-dimensional model based on an angle between the two of the first subset of the plurality of faces. The instructions, when executed by the one or more processors, further cause the one or more processors to remove at least one other one of the first subset of the plurality of faces from the composite three-dimensional model based on determining that the two of the first subset of the plurality of faces correspond to the outer shell of the composite three-dimensional model.

DETAILED DESCRIPTION

Generally speaking, an outer shell routine may be used in a three-dimensional modeling application to determine an outer shell of a composite three-dimensional model (or "composite model"). The outer shell includes all faces and edges of the composite model that are on an exterior (i.e., outermost) portion of the composite model. The outer shell routine may remove interior geometry from the composite model, such as interior faces and edges that are contained within the outer shell. Thus, after application of the outer shell routine to the composite model, the composite model may include only the outer shell. By determining the outer shell of the composite model and removing interior geometry from the composite model, fewer computational resources may be required to render and manipulate the composite model using the three-dimensional modeling application, without compromising visual accuracy from any vantage point outside the composite model. In one example, the outer shell routine may allow a user of the three-dimensional modeling application to select a number of three-dimensional objects that are to be considered as a composite three-dimensional model. The outer shell routine may then determine intersections between faces of the three-dimensional objects that form the composite model, and may split the intersecting faces accordingly. The outer shell routine may then determine whether each of the resulting faces corresponds to the outer shell of the composite model or to an interior portion of the composite model by identifying an uppermost face and then determining angles between faces at common boundary edges. All faces determined to correspond to the interior portion of the composite model may be removed.

Figure 1:
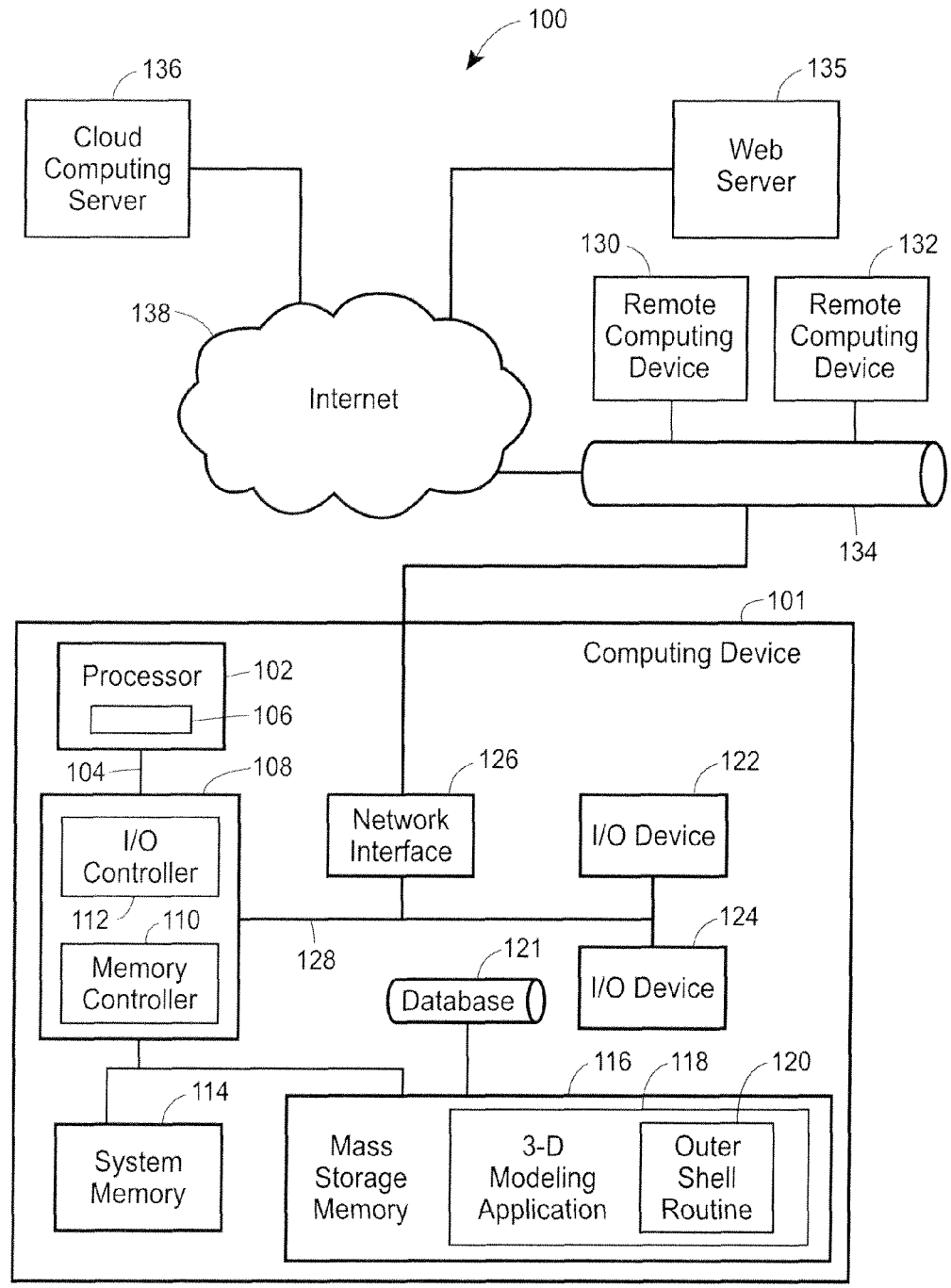
FIG. 1 is a high-level block diagram of an example computing environment for a three-dimensional modeling system having a computing device that may be used to implement a method for eliminating interior geometry from a composite model in a three-dimensional modeling application.

FIG. 1 is a high-level block diagram of an example computing environment for a three-dimensional modeling system 100 having a computing device 101 that may be used to implement a method for eliminating interior geometry from a composite model in a three-dimensional modeling application. The computing device 101 may include a personal computer, thin client, or other known type of computing device. As shown in FIG. 1, the computing device 101 may include a processor 102 that is coupled to an interconnection bus 104. The processor 102 includes a register set or register space 106, which is depicted in FIG. 1 as being entirely on-chip, but which could alternatively be located entirely or partially off-chip and be directly coupled to the processor 102 via dedicated electrical connections and/or via the interconnection bus 104. The processor 102 may include any suitable processor, processing unit or microprocessor. Although not shown in FIG. 1, the system 100 may be a multi-processor system and, thus, may include one or more additional processors that are identical or similar to the processor 102 and that are communicatively coupled to the interconnection bus 104.

The processor 102 of FIG. 1 may be coupled to a chipset 108, which may include a memory controller 110 and a peripheral input/output (I/O) controller 112. As is well known, a chipset typically provides I/O and memory management functions as well as a plurality of general purpose and/or special purpose registers, timers, etc. that are accessible or used by one or more processors coupled to the chipset. The memory controller 110 performs functions that enable the processor 102 (or processors if there are multiple processors) to access a system memory 114 and a mass storage memory 116.

The system memory 114 may include any desired type of volatile and/or non-volatile memory such as, for example, static random access memory (SRAM), dynamic random access memory (DRAM), flash memory, read-only memory (ROM), etc. The mass storage memory 116 may include any desired type of mass storage device. For example, if the three-dimensional modeling system 100 is used to implement the functionality of a three-dimensional modeling application 118, the mass storage memory 116 may include a hard disk drive, an optical drive, a tape storage device, a solid-state memory (e.g., a flash memory, a RAM memory, etc.), a magnetic memory (e.g., a hard drive), or any other memory suitable for mass storage. The three-dimensional modeling application 118 may be configured to implement an outer shell routine 120 that eliminates interior geometry from a composite model. As used herein, the terms module, function, operation, procedure, routine, step, and method refer to computer program logic or computer executable instructions that provide the specified functionality to the computing device. Thus, a module, function, operation, procedure, routine, step, and method can be implemented in hardware, firmware, and/or software. In one embodiment, program modules and routines (e.g., the three-dimensional modeling application 118 and the outer shell routine 120, and various definitions of parametric objects as further described below) may be stored in the mass storage memory 116, loaded into the system memory 114, and executed by the processor 102 or can be provided from computer program products that are stored in tangible non-transitory computer-readable storage media (e.g. RAM, hard disk, optical/magnetic media, etc.). The mass storage memory 116 may also be coupled to a database 121 that may store a plurality of definitions of parametric objects, and the three-dimensional modeling application 118 and outer shell routine 120 may access the database 121, and thus the stored parametric objects, via a database interface module (not shown).

The peripheral I/O controller 112 may perform functions that enable the processor 102 to communicate with peripheral input/output (I/O) devices 122 and 124 and a network interface 126 via a peripheral I/O bus 128. The I/O devices 122 and 124 may each be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The I/O devices 122 and 124 may be used with the three-dimensional modeling application 118 and the outer shell routine 120 to receive, for example, one or more of parametric object definitions, user selections of objects to be operated on by the outer shell routine 120, etc., as further described below. The network interface 126 may be, for example, an Ethernet device, an asynchronous transfer mode (ATM) device, an 802.11 wireless interface device, a DSL modem, a cable modem, a cellular modem, etc., that enables the three-dimensional modeling system 100 to communicate with one or more other computer systems having at least some of the elements described in relation to the three-dimensional modeling system 100.

While the memory controller 110 and the I/O controller 112 are depicted in FIG. 1 as separate functional blocks within the chipset 108, the functions performed by these blocks may be integrated within a single integrated circuit or may be implemented using two or more separate integrated circuits.

The three-dimensional modeling system 100 may also implement the three dimensional modeling application 118 and the outer shell routine 120 on one or more remote computing devices, such as remote computing devices 130 and 132. The remote computing devices 130 and 132 may communicate with the computing device 101 over an Ethernet link 134. For example, the computing device 101 may receive definitions of parametric objects created by a three-dimensional modeling application executing on one or both of the remote computing devices 130 and 132. In other embodiments, the three-dimensional modeling application and/or the outer shell routine 120 may be retrieved by the computing device 101 from a web server 135 via the Internet 138. In still other embodiments, the three-dimensional modeling application 118 and/or the outer shell routine 120 may be retrieved by the computing device 101 from a cloud computing server 136 via the Internet 138. When using the cloud computing server 136, the retrieved three-dimensional modeling application 118 and/or the outer shell routine 120 may be programmatically linked with the computing device 101. The three-dimensional modeling application 118 and/or the outer shell routine 120 may also be "plug-ins" adapted to execute in a web-browser located on one or more of the computing devices 101, 130, and 132.

Generally speaking, the three-dimensional modeling application 118 may call the outer shell routine 120 in order to remove interior geometry from a composite model. For example, a user of the three-dimensional modeling application 118 may model complex three-dimensional objects using primitive "building block" objects, such as three-dimensional rectangular objects, cones, spheres, etc. In some examples, one or more such primitive objects may have been created or defined using a different modeling application, such as a legacy modeling application from which it is desired to import the definitions of such primitive objects into the three-dimensional modeling application 118. While such primitive objects may simplify the process of modeling a complex three-dimensional object, it may be desirable to remove interior geometry created as a byproduct of the use of primitive objects. Thus, for example, the user may use the three-dimensional modeling application 118 to select the primitive objects that are to be operated on by the outer shell routine 120. According to an embodiment, the user may then select or enter a command to cause the outer shell routine 120 to be executed, thereby removing interior geometry from the selected primitive objects and leaving the desired complex three-dimensional object.

Figure 2A:
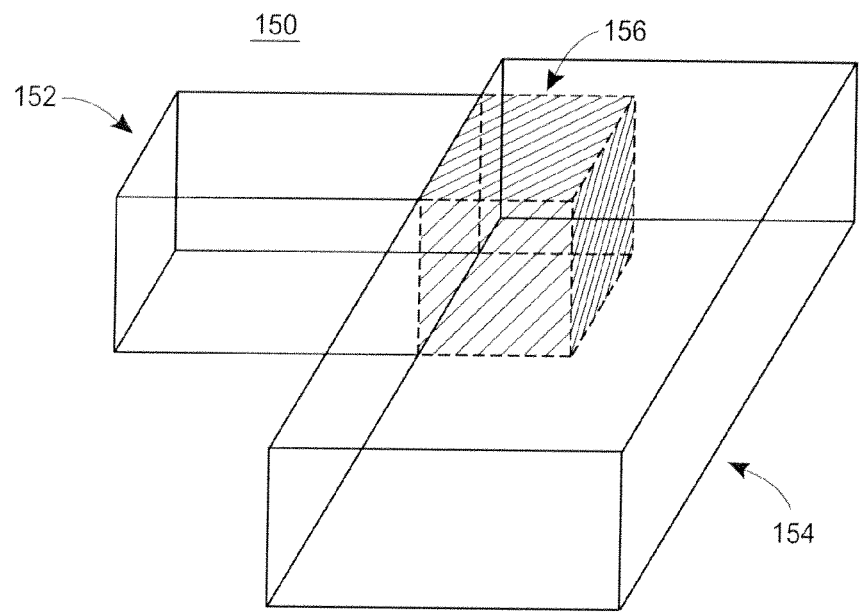
FIG. 2A illustrates a composite three-dimensional model prior to application of an outer shell routine thereto.

For example, FIG. 2A illustrates a composite model 150 prior to application of the outer shell routine 120 thereto. The composite model 150 includes intersecting primitive rectangular solids 152 and 154. For ease of illustration, a volume of intersection 156 is shown with dashed lines in order to indicate that, in at least some embodiments, the volume of intersection 156 is not visible from an exterior vantage point, i.e., a vantage point outside the composite model 150. For example, in some embodiments, the three-dimensional modeling application 118 may allow a user to view an object, a model, etc. from any desired vantage point. Of course, the composite model 150 in FIG. 2A is merely for purposes of illustration. A composite model created with a three-dimensional modeling application, such as the three-dimensional modeling application 118, may be as complex or as simple as desired, and may include any suitable type or types of primitives, which type or types of primitives may or may not include rectangular solids as shown in FIG. 2A. Thus, in just one alternative example, the primitive solids 152 and 154 may actually be a portion of a larger composite model.

In any event, the volume of intersection 156 may result from, as an example, a user specifying the shape of a relatively complex object (e.g., the composite model 150) by placing the primitive solids 152 and 154 in desired positions. In another embodiment, the current user or a previous user may have already defined the composite model 150 and stored parametric definitions (as further described below) corresponding to the composite model 150 in the database 121. The user may then retrieve the stored parametric definitions corresponding to the composite model 150 by, for example, selection of an appropriate icon or command within the three-dimensional modeling application.

Figure 2B:
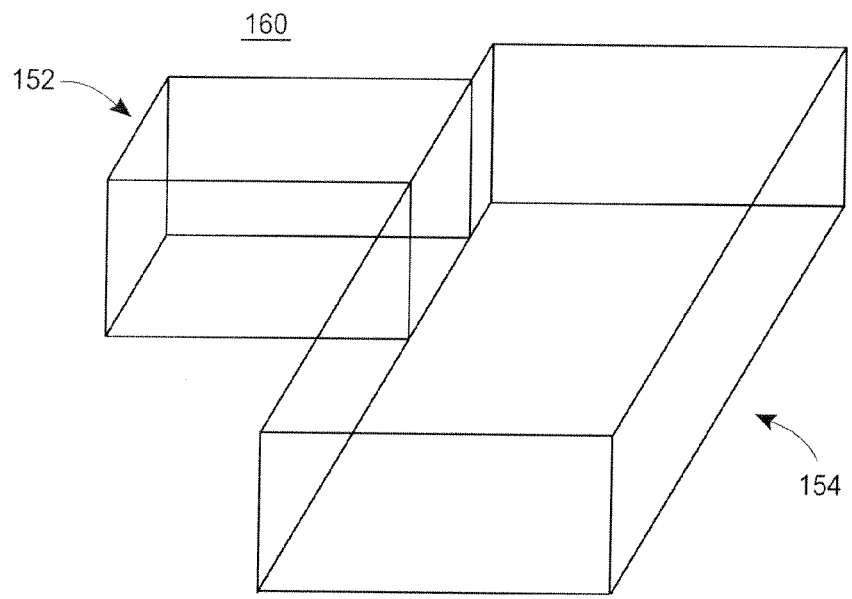
FIG. 2B illustrates an updated composite three-dimensional model after application of the outer shell routine to the composite three-dimensional model of FIG. 2A.

FIG. 2B illustrates an updated composite model 160 after application of the outer shell routine 120 to the composite model 150, according to an embodiment. As shown in FIG. 2B, the updated composite model 160 includes the non-intersecting portions of the primitive objects 152 and 154. The updated composite model 160 does not, however, include the portions of the primitive objects 152 and 154 that fall within the volume of intersection 156. That is, in the example of FIG. 2B, the outer shell routine 120 removed the faces and edges of the composite model 150 that fell within the volume of intersection 156 in order to generate the resulting updated composite model 160.

Of course, the outer shell routine 120 may have a number of other suitable uses that are not limited to the case of modeling objects using primitives. For example, a user of the three-dimensional modeling application 118 may create a model of a building by specifying the shape of each individual room in the building. Once the model of the building is created, however, the user may only require an ability to view the building from its exterior. As an example, the user may model a collection of buildings and may be primarily concerned with being able to view the overall appearance of the collection of buildings, without the need to view interior details of any individual building. In such a situation, the user may, for example, use the three-dimensional modeling application 118 to select one or more of the buildings that are to be operated on by the outer shell routine 120. The user may select or enter a command to cause the outer shell routine 120 to be executed, thereby removing interior geometry from the selected building or buildings.

Figure 3A:
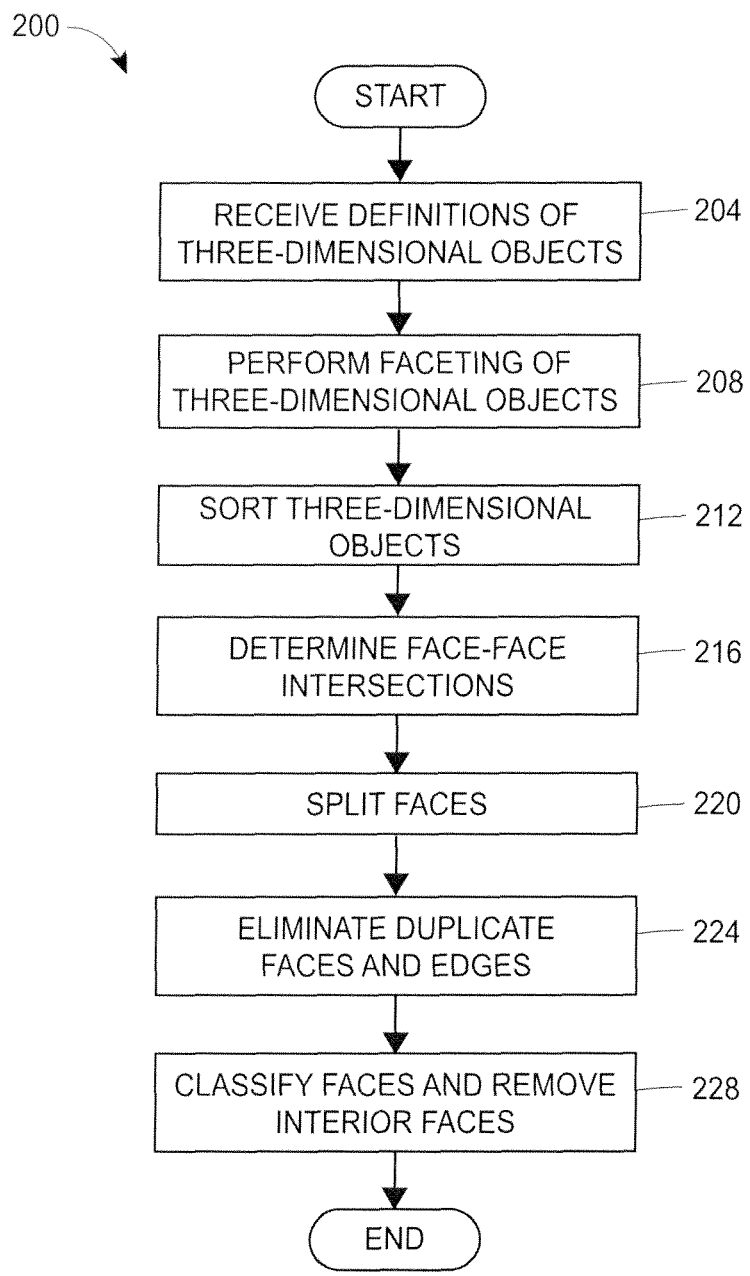
FIG. 3A is a flow chart of an example method for eliminating interior geometry from a composite three-dimensional model in a three-dimensional modeling application.

FIG. 3A is a flow chart of an example method 200 that may be used by the outer shell routine 120 to eliminate interior geometry from a composite model in a three-dimensional modeling application, such as the three-dimensional modeling application 118. At a block 204, definitions of a plurality of three-dimensional objects may be received. In some embodiments, the definitions received by the block 204 may be parametric definitions of three-dimensional objects. The parametric definitions may be received from, for example, one or more of the database 121, another modeling application (not shown) such as a legacy modeling application, another routine of the three-dimensional modeling application 118, another instance of the three-dimensional modeling application 118 (e.g., via the Internet 138), the web server 135, the cloud computing server 136, one or more of the remote computing devices 130 and 132, the mass storage memory 116, etc. The definitions of the plurality of three-dimensional objects together define one or more manifold shells (which may also be referred to as "manifold volumes").

As is known, a manifold shell is a collection of faces and edges where each edge bounds two faces and where none of the faces intersect except at such edges. A manifold shell may be distinguished from an open shell, in which some edges bound only one face. The particular three-dimensional objects that are defined by the received definitions may be specified by a user of the three-dimensional modeling application 118. In this manner, the user of the three-dimensional modeling application may select or otherwise identify a particular group or subset of three-dimensional objects that are desired to be included in the composite model for which an outer shell is to be generated, and may, in some cases, exclude particular three-dimensional objects that are not desired to be included in the composite model.

In the case of a parametric definition of a three-dimensional object, such as a manifold volume, the parametric definition may specify the type of the object and one or more attributes of the object. As one example, a parametric definition of a manifold volume may specify that the manifold volume is a cone, and may further specify a radius of the cone, a height of the cone, a position of at least one point of the cone, and an orientation of the cone. Generally speaking, the orientation of a three-dimensional object may be determined based on orientations of a plurality of individual faces which together constitute the three-dimensional object. In the case of three-dimensional objects such as a cone or sphere, the orientations of such faces may be determined following faceting of the object, as further described below. The orientation of a face may be indicated by a direction of a corresponding face normal, which may be determined based on a plane equation corresponding to the face. In some embodiments, the three-dimensional modeling application 118 treats a three-dimensional manifold volume whose faces are all oriented inward as a solid manifold volume, and treats a three-dimensional manifold volume whose faces are all oriented outward as a void. In some embodiments, the three-dimensional modeling application 118 and/or the outer shell routine 120 thereof may be configured to reorient one or more individual faces of a three-dimensional object to ensure consistent inward or outward orientation of each of the faces of the three-dimensional object.

Figure 4:
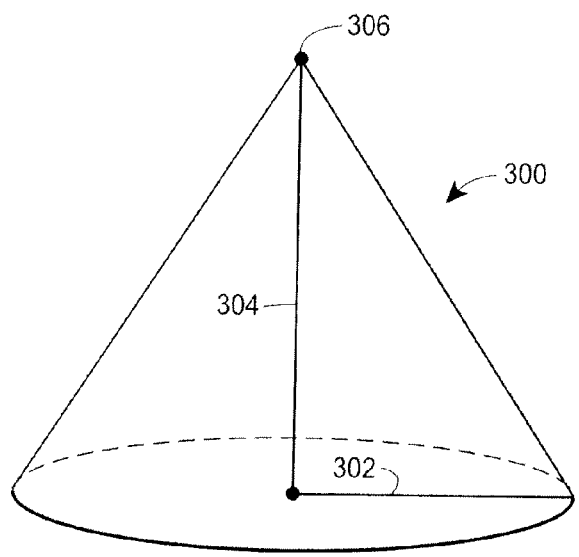
FIG. 4 illustrates an example cone that may be defined by a parametric definition.

A parametric definition of a three-dimensional object may provide the three-dimensional modeling application 118 with sufficient information to render a corresponding manifold volume in this example, a cone. FIG. 4 illustrates an example cone 300 that may be defined by a parametric definition received by the block 204. In the example of FIG. 4, a parametric definition of the cone 300 may include an indication that the parametric definition defines a cone, an indication of a cone radius 302, an indication of a cone height 304, and an indication of a position or location of a cone apex 306 in a three-dimensional space. By way of example, the indication of the position of the cone apex 306 may indicate that the cone apex 306 is positioned at a particular (X, Y, Z) coordinate in a three-dimensional Cartesian coordinate system used by the three-dimensional modeling application 118.

Of course, the definitions received by the block 204 may also or alternatively include one or more parametric definitions of one or more other types of three-dimensional objects, which may include, for example, one or more open shells, one or more manifold shells, or a suitable combination thereof. For example, the definitions received by the block 204 may include one or more of a parametric definition of a cylinder, a parametric definition of a cube, a parametric definition of any rectangular object, etc. As further described below, the three-dimensional modeling application 118 may generate or identify a composite model using the received definitions of the plurality of three-dimensional objects, which together may form the composite model.

Figure 5:
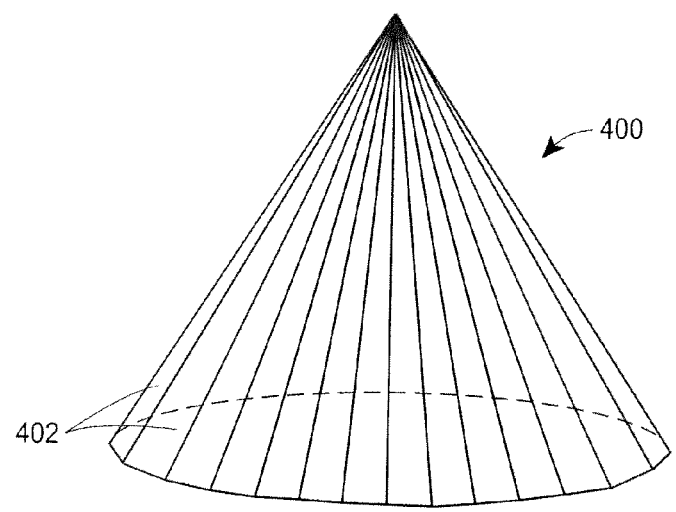
FIG. 5 illustrates an example of a faceted cone that corresponds to the example cone of FIG. 4 as defined by an indication of a cone radius, an indication of a cone height, an indication of a position of a cone apex, and an indication of a cone orientation.

At a block 208, faceting may be performed based on each of the definitions received by the block 204. As is well known, faceting of a three-dimensional object may include representing the entire three-dimensional object as a collection of planar faces. In some examples, the block 208 may not be required, such as when the definitions received by the block 204 already define the plurality of three-dimensional objects in the composite model in terms of faces and edges. However, faceting may be required when, for example, the block 204 receives parametric definitions of one or more of the plurality of three-dimensional objects. FIG. 5 illustrates an example of a faceted cone 400 that corresponds to the example cone 300 of FIG. 4 as defined by the indication of the cone radius 302, the indication of the cone height 304, the indication of the position of the cone apex 306, and an indication of the cone orientation. The faceted cone 400 includes a plurality of triangular faces 402 which together are used to approximate the curved shape of the surface of the cone that joins the cone apex 306 to the base of the cone. As will be understood, the block 208 may perform the faceting by implementing any suitable computational method that approximates a shape, such as a curved surface, using a plurality of individual faces. In some embodiments, as noted above, the three-dimensional modeling application 318 may render a composite model by rendering the faceted representations of each of the three-dimensional objects whose parametric definitions were received by the block 204.

Figure 6:
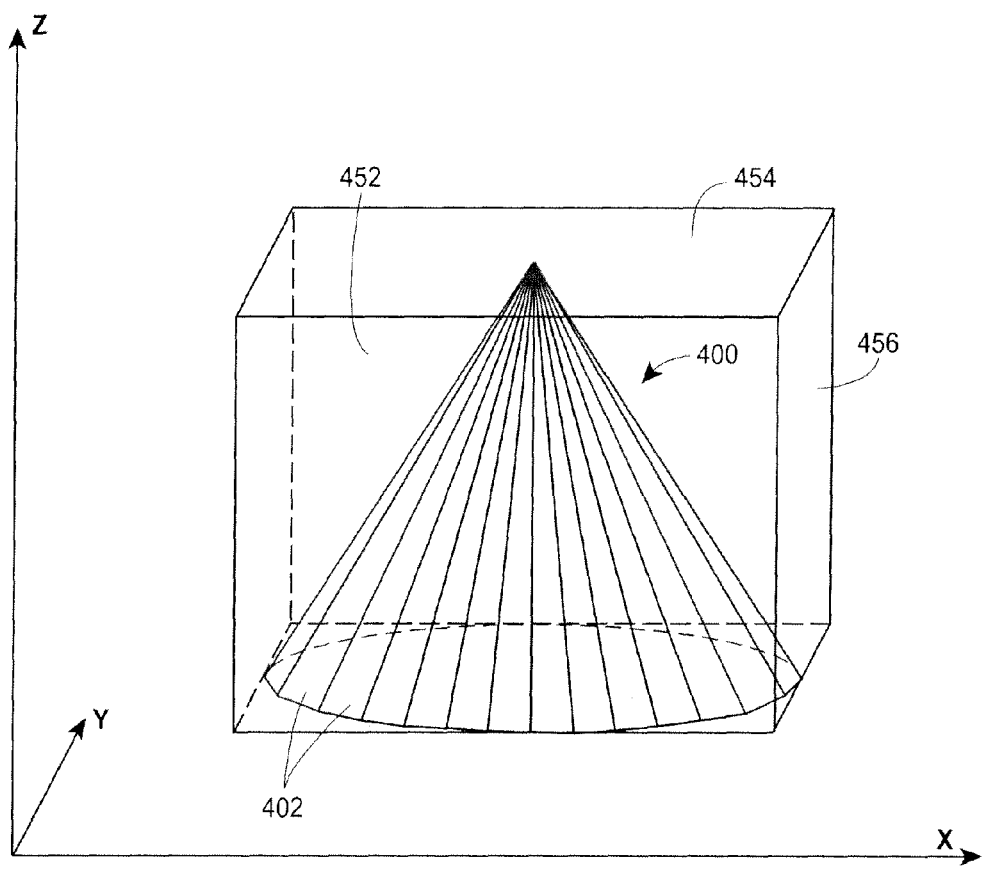
FIG. 6 illustrates an example bounding box for the faceted cone of FIG. 5.

At a block 212, the plurality of three-dimensional objects whose definitions were received by the block 204 and whose faceted representations were, in some embodiments, generated by the block 208, may be sorted. In some embodiments, the block 212 may sort the plurality of three-dimensional objects by first computing a "bounding box" for each of the three-dimensional objects as well as an overall "bounding box" for the composite three-dimensional model. Generally speaking, a bounding box for a three-dimensional object may be a three-dimensional rectangular object having each face perpendicular to a coordinate axis of the coordinate system (e.g., a three-dimensional Cartesian coordinate system) used by the three-dimensional modeling application 118. The bounding box for a particular three-dimensional object may be defined to be the smallest such rectangular object which completely encloses the particular three-dimensional object. For example, FIG. 6 illustrates a bounding box for the faceted cone 400. The bounding box includes six faces, three of which are designated 452, 454, and 456. As will be seen from FIG. 6, each face of the bounding box is perpendicular to an axis of the illustrated Cartesian coordinate system, and the bounding box is the smallest such box that completely encloses the faceted cone 400. For example, the front face 452 of the bounding box is perpendicular to the Y-axis of the Cartesian coordinate system and touches the point of the faceted cone 400 having the smallest Y-coordinate. Similarly, the top face 454 of the bounding box is perpendicular to the Z-axis of the Cartesian coordinate system and touches the point of the faceted cone 400 having the largest Z-coordinate (i.e., the apex of the faceted cone 400). The right face 456 of the bounding box is perpendicular to the X-axis of the Cartesian coordinate system and touches the point of the faceted cone 400 having the largest X-coordinate.

The block 212 may sort the three-dimensional objects within the composite three-dimensional model based on the distances from the minimum (X, Y, Z) Cartesian coordinates of the bounding box for the composite three-dimensional model to the respective minimum (X, Y, Z) Cartesian coordinates of the bounding boxes for the three-dimensional objects within the composite three-dimensional model. For example, the block 212 may sort the three-dimensional objects according to an ascending order of these distances. The bounding box for the composite three-dimensional model may be determined in the same manner as the bounding boxes for each of the three-dimensional objects within the composite three-dimensional model. In some embodiments, the minimum (X, Y, Z) Cartesian coordinates of a bounding box are the "lowest" (X, Y, Z) Cartesian coordinates of that bounding box and not necessarily (X, Y, Z) Cartesian coordinates that have a smallest distance from an origin of the three-dimensional Cartesian coordinate system. For example, the minimum (X, Y, Z) Cartesian coordinates of a bounding box may be determined based on distances of various coordinates from the origin, but by considering a distance involving negative coordinates along one or more axes to be lower than a distance that merely has a small magnitude. Methods for computation of the distance of (X, Y, Z) Cartesian coordinates from an origin of an associated Cartesian coordinate system are well known to those of skill in the art. As further described below, the sorting performed by the block 212 may facilitate the efficient determination of intersections between faces of each of the three-dimensional objects or, in some cases, between faces of the faceted representations of each of the three-dimensional objects.

At a block 216, intersections between faces of the plurality of three-dimensional objects (also referred to herein as "face-face intersections") are determined. In some embodiments, the face-face intersections are determined by considering two of the plurality of three-dimensional objects at a time. For example, a result of the sorting performed by the block 212 may be used to determine an order in which the plurality of three-dimensional objects are to be considered. Thus, according to an embodiment, the two objects whose bounding boxes have minimum (X, Y, Z) Cartesian coordinates at the smallest distances from the minimum (X, Y, Z) Cartesian coordinates of the bounding box for the composite three-dimensional model will be considered first. One or more face-face intersections between such objects may be identified or, in some cases, it may be determined that such objects, despite having the two lowest minimum (X, Y, Z) Cartesian coordinates, do not have any face-face intersections. The determination of face-face intersections between two objects under consideration may be performed by any of a number of suitable computational methods. In some embodiments, the determination may include computing bounding boxes for each individual face of each object and determining intersections between such bounding boxes.

After any face-face intersections between a first pair of two objects are determined, the block 216 may further determine face-face intersections between each object in the first pair and a third one of the plurality of three-dimensional objects, according to the sorting performed by the block 212. The determination of all remaining face-face intersections among the plurality of three-dimensional objects may continue in a similar manner. For example, the block 216 may next identify three face-face intersections, i.e., intersections between faces of each respective one of the three previously considered objects and a fourth one of the plurality of objects, and so on for further operations performed by the block 216.

Figure 7:
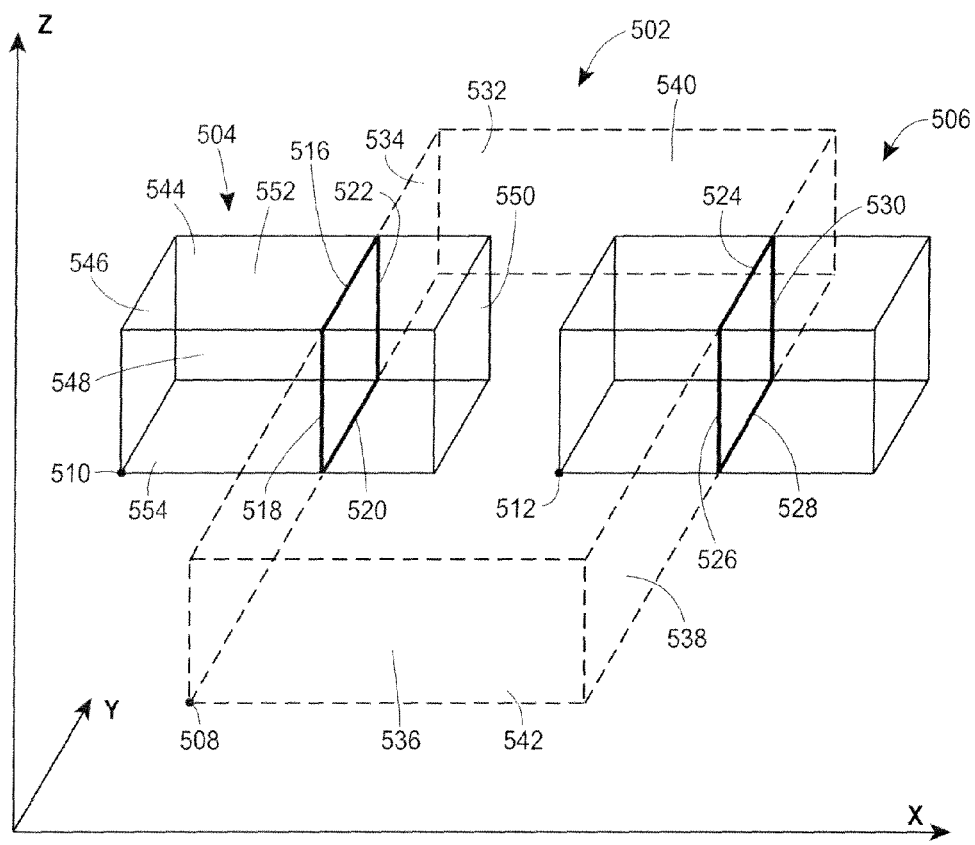
FIG. 7 illustrates three example three-dimensional manifold volumes in a three-dimensional Cartesian coordinate system.

With continued reference to the block 216, FIG. 7 illustrates three example three-dimensional manifold volumes 502, 504, and 506 in an example three-dimensional Cartesian coordinate system. For ease of illustration, the manifold volumes 502, 504, and 506 are rectangular volumes whose faces are each perpendicular to a coordinate axis of the three-dimensional Cartesian coordinate system. Accordingly, the respective bounding boxes of the manifold volumes 502, 504, and 506 are simply the manifold volumes 502, 504, and 506 themselves. The manifold volumes (and, thus, their bounding boxes) 502, 504, and 506 have respective minimum (X, Y, Z) Cartesian coordinates 508, 510, and 512. In FIG. 7, the manifold volume 502 is shown with a dashed line instead of a solid line for ease of illustration in showing the relative positions of the manifold volumes 502, 504, and 506.

While not shown in FIG. 7 for purposes of simplicity, it will be understood from the foregoing disclosure that the bounding box of a composite three-dimensional model formed from the manifold volumes 502, 504, and 506 will be a rectangular box that includes faces that are each perpendicular to a coordinate axes and will be just large enough to enclose each of the manifold volumes 502, 504, and 506. It will further be understood that the block 212 may sort the manifold volumes according to the following order: (i) the manifold volume 502, which has the bounding box having minimum (X, Y, Z) Cartesian coordinates that are at a smallest distance from the minimum (X, Y, Z) Cartesian coordinates of the bounding box for the composite three-dimensional model, followed by (ii) the manifold volume 504 and, finally, (iii) the manifold volume 506. Therefore, the block 216 may first identify face-face intersections between the manifold volumes 502 and 504. In particular, as shown in FIG. 7, the block 216 may identify face-face intersections (or "lines of intersection") 516, 518, 520, and 522 between the manifold volumes 502 and 504. The block 216 may then identify face-face intersections (or "lines of intersection") 524, 526, 528, and 530 between the manifold volumes 504 and 506. With continued reference to the block 216, once all pairs of the plurality of three-dimensional objects (e.g., the manifold volumes 502, 504, and 506 of FIG. 7) have been considered and all face-face intersections therebetween have been identified, the method may proceed to a block 220.

At the block 220, each face in the composite model that intersects another face may be split according to one or more of the determined intersections. In particular, for each face that intersects one or more other faces in the composite model, the outer shell routine 120 redefines the face as two or more faces by "splitting" the face along the line of intersection. For example, with continued reference to FIG. 7, the first manifold volume 502 may include a top face 532, a left face 534, a front face 536, a right face 538, a back face 540, and a bottom face 542. The second manifold volume 504 may include a top face 544, a left face 546, a front face 548, a right face 550, a back face 552, and a bottom face 554. In the illustrated example, the left face 534 of the first manifold volume 502 intersects the top face 544, the front face 548, the back face 552, and the bottom face 554 of the second manifold volume 504. Thus, in some embodiments, the block 220 may split each of the top face 544, the front face 548, the back face 552, and the bottom face 554 of the second manifold volume 504 along its respective line of intersection 516, 518, 520, or 522 with the left face 534 of the first manifold volume 502. For example, the block 220 may redefine the top face 544 of the second manifold volume 504 as two faces, one to the left of the line of intersection 516 and one to the right of the line of intersection 516. Furthermore, in some cases, a face of a three-dimensional object may intersect more than one other face of another three-dimensional object in the same composite model. For example, as further shown in FIG. 7, the left face 534 of the first manifold volume 502 intersects not only the top face 544 of the second manifold volume 504, but also the front and back faces 548 and 552 of the second manifold volume 504 along the lines of intersection 518 and 522, respectively. In this example, the block 220 may split the left face 534 of the first manifold volume 502 by redefining the left face 534 as three faces, one in front of the line of intersection 518, one between the lines of intersection 518 and 522, and one behind the line of intersection 522.

As the block 220 continues, each of the faces of the manifold volumes 502, 504, and 506 that intersects at least one other face of one of the manifold volumes 502, 504, and 506 may be redefined as two or more faces (which redefined faces may also be referred to as "updated faces") in a manner similar to that described above. The method may then proceed to a block 224.

At the block 224, duplicate faces and edges may be eliminated. Duplicate faces and edges may, for example, result from splitting operations performed on shared faces. For example, with continued reference to FIG. 7, the top face 544 of the second manifold volume 504 intersects the top face 532 of the first manifold volume 502 along the line of intersection 516, in addition to intersecting the left face 534 of the first manifold volume 502 along the line of intersection 516. As can be seen from the example of FIG. 7, the area of intersection between the top faces 532 and 544 of the first and second manifold volumes 502 and 504 is an area that is common to both faces. Thus, after the splitting of the top face 544 of the second manifold volume 504 along the line of intersection 516 (e.g., as performed by the block 220), the resulting face defined by the portion of the top face 544 that lies to the right of the line of intersection 516 will be common to a portion of the top face 532 of the first manifold volume 502. Accordingly, in one embodiment, the portion of the top face 544 that lies to the right of the line of intersection 516 will be determined to be a duplicate face and will be removed. Of course, in another embodiment, the portion of the top face 544 that lies to the right of the line of intersection 516 could be retained and the overlapping portion of the top face 532 of the first manifold volume 502 could be removed instead. Similarly, the portion of the top face 544 that lies to the right of the line of intersection 516 will have an edge that is common to a portion of an edge of the top face 532 (i.e., along the line of intersection 516). Accordingly, in one embodiment, this common edge of the portion of the top face 544 that lies to the right of the line of intersection 516 will be determined to be a duplicate edge and will be removed.

After duplicate faces and edges are eliminated by the block 224, the composite model will include a set of non-overlapping faces which can then be evaluated by a block 228 that classifies each of the non-overlapping faces as "outside," e.g., on an outer shell of the composite model, or within an "interior" of the outer shell, and removes those faces classified as interior. The method 200 may then end.

Figure 3B:
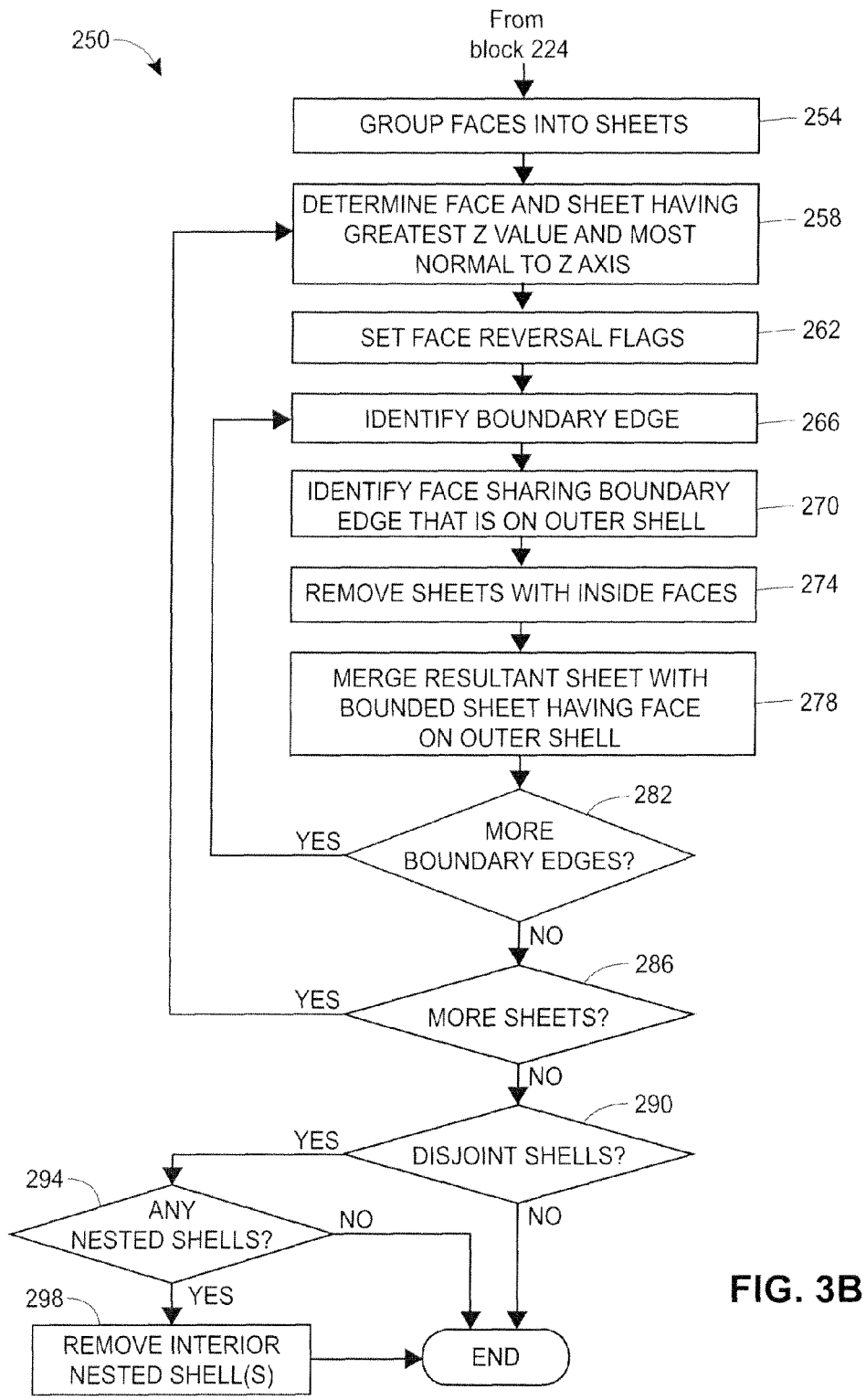
FIG. 3B is a flow chart of an example method for classifying faces of a composite three-dimensional model and removing faces classified as interior to an outer shell of the composite three-dimensional model.

FIG. 3B is a flow chart of an example method 250 for classifying faces of a three-dimensional model and removing interior (inside) faces, and which may be used by the three-dimensional modeling application 118 to implement the block 228. At a block 254, faces of the composite model may be grouped into sheets. In particular, such grouping may be performed with respect to the non-overlapping faces of the composite model which result from the elimination of duplicate faces and edges by the block 224. Stated another way, an initial version of the plurality of updated faces as defined by the block 220 may be grouped by the block 254 into a final version of a plurality of updated faces, which final version may be referred to as a plurality of sheets. According to an embodiment, two faces belong to a common sheet if the two faces share a common boundary edge that does not bound any other faces. Thus, a particular sheet may include two faces, more than two faces, or only one face.

Figure 8:
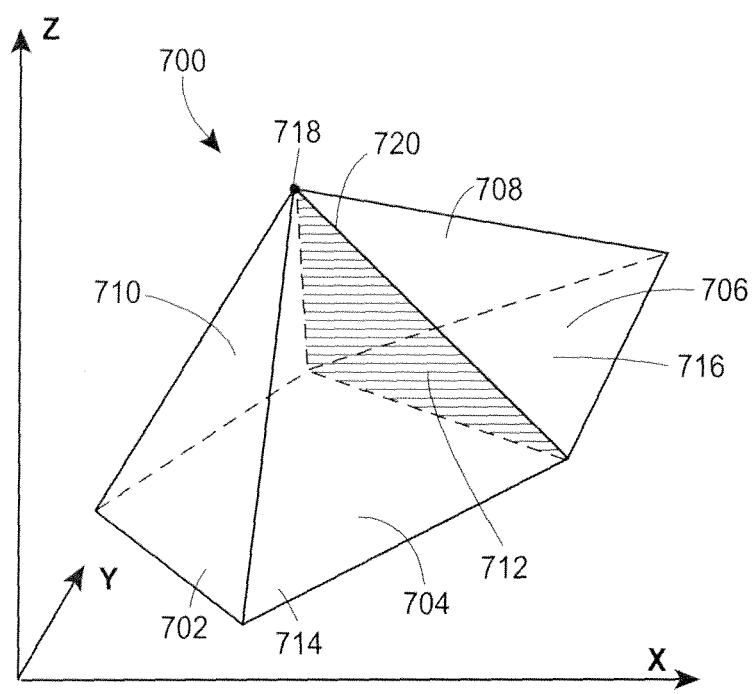
FIG. 8 illustrates an example composite model including three sheets, and also shows the placement of the X, Y, and Z axes of a three-dimensional Cartesian coordinate system with respect to the three sheets.

FIG. 8 illustrates an example composite model 700 that includes faces 702, 704, and 706 on a front portion; faces 708 and 710 on a rear portion; a face 712 on an interior of the composite model 700; and faces 714 and 716 on a bottom portion. Of course, the example composite model 700 is illustrative in nature, and in one alternative embodiment, the faces 702-716 represent only a portion of an example composite model, with the remainder of the example composite model not shown in FIG. 8. As shown in FIG. 8, the edge between the faces 702 and 704 does not bound any other face besides the faces 702 and 704. Similarly, the edge between the faces 702 and 710 bounds only the faces 702 and 710, the edge between the faces 702 and 714 bounds only the faces 702 and 714, the edge between the faces 704 and 714 bounds only the faces 704 and 714, and the edge between the faces 710 and 714 bounds only the faces 710 and 714. Consequently, the faces 702, 704, 710, and 714 form a single sheet. As further seen from FIG. 8, the edge between the faces 706 and 708 bounds only the faces 706 and 708, the edge between the faces 706 and 716 bounds only the faces 706 and 716, and the edge between the faces 708 and 716 bounds only the faces 708 and 716. Still further, it can be seen that none of the edges of the face 712 bound only two faces. For example, the foremost edge of the face 712 bounds the faces 712, 704, and 706; the rearmost edge of the face 712 bounds the faces 712, 708, and 710; and the bottommost edge of the face 712 bounds the faces 712, 714, and 716. Accordingly, one sheet of the composite model 700 includes only the face 712. It will also be appreciated that edge bounding the faces 704 and 706, for example, also bounds the face 712, the faces 704 and 706 are not part of the same sheet. As will be appreciated from the description herein, by grouping faces into sheets, the remaining operations of the method 250 may, in at least some situations, be performed more efficiently, such as by using fewer computational resources.

At a block 258, the outer shell routine 120 may determine the face of the composite model that (i) has the greatest Z-coordinate in the three-dimensional Cartesian coordinate system used in representing the composite model and (ii) is oriented most normal to the Z-axis of the three-dimensional Cartesian coordinate system. The block 258 may also identify, based on a result of the operations performed by the block 254, the sheet that includes the face satisfying both of the above criteria. In another embodiment, the block 254 may be eliminated and the block 258 may not identify the sheet that includes the face satisfying both of the above criteria. As will be understood, the face that meets both of these criteria may be regarded as the "uppermost" or "highest" face in the composite model and therefore will be located on the outer shell of the composite model. The determination of which face meets both of the above criteria may first include determining which one or more faces of the composite model satisfies criterion (i), i.e., which one or more faces of the composite model have the greatest Z-coordinate. Then, if more than one face has the greatest Z-coordinate, such as when two faces have the same maximum Z-coordinate, the outer shell routine 120 may determine which of those faces is oriented most normal to the Z-axis by determining which of those faces has a normal vector that is most parallel to the Z-axis. More particularly, the outer shell routine 120 may determine the normal vector of each face according to methods that will be recognized by those of skill in the art in light of the teaching and disclosure herein, and the outer shell routine 120 may then perform dot product operations using the normal vector of each face and a unit vector along the Z-axis as operands. In order to avoid computational complexity arising from potentially inconsistent face orientations, the outer shell routine 120 may simply evaluate the magnitude of each dot product, and may determine that the face corresponding to the highest-magnitude dot product is oriented most normal to the Z-axis.

With continued reference to the block 258, and referring again to the example of FIG. 8, the face 706 has the highest Z-coordinate and is most normal to the Z-axis. That is, while the faces 702, 704, 706, 708, 710, and 712 each have a point located at a vertex 718 of the example composite model 700, the face 706 is the one of the faces 702-712 that is most normal to the Z-axis. Therefore, the block 258 may determine that the face 706 is the face that satisfies criteria (i) and (ii) above by performing, for example, the aforementioned dot product operations using the unit vector along the Z-axis and each of the sheets 702-712, in turn, as operands. Thus, the block 258 may determine that the face 706 is on the outer shell of the composite model 700. The block 258 may also identify the sheet including the faces 706, 708, and 716 as the sheet including the face that satisfies the above criteria. Because each edge of a face within a sheet bounds only that face and one other face, it will be understood that if one face of a sheet is on the outer shell of a composite model, all faces of that sheet are on the outer shell of the composite model. Accordingly, by identifying the sheet including the faces 706, 708, and 716 as including the face satisfying the above criteria, the block 258 effectively identifies the faces 706, 708, and 716 as all being on the outer shell of the example composite model 700.

In some cases, more than one face may satisfy criteria (i) and (ii) above. In such cases, the outer shell routine 120 may arbitrarily select one of such faces to be regarded as being on the outer shell of the composite model. Thereafter, subsequent operations of the method will result in determinations that each other face satisfying criteria (i) and (ii) is also on the outer shell. In an alternative example, the block 258 may immediately determine that all such faces satisfying criteria (i) and (ii) above and not just one arbitrarily selected face—are on the outer shell.

At a block 262, consistent orientation of the faces within each sheet of the composite model may be ensured by appropriate setting of one or more face reversal flags. Such setting of face reversal flags may, in conjunction with operations described below, ensure that the faces of the composite model define solids, and in some cases voids, as appropriate. More particularly, in some embodiments, the three-dimensional modeling application 118 treats a three-dimensional manifold volume whose faces are all oriented inward (i.e., toward the inside of the volume) as a solid manifold volume, and treats a three-dimensional manifold volume whose faces are all oriented outward (i.e., toward the outside of the "volume") as a void. Thus, for example, the three-dimensional modeling application 118 and/or the outer shell routine 120 thereof may ensure that all faces of a composite volume are oriented so as to define solids and not voids. In some cases, however, the three-dimensional modeling application 118 and/or the outer shell routine 120 may allow a user to model, for example, a building having one or more voids that, although completely enclosed, are not to be considered as a part of the volume contained within the building. In such cases, the three-dimensional modeling application 118 and/or the outer shell routine 120 may ensure that any faces that define voids are oriented outward, including, if necessary, reorienting such faces from an initial inward orientation to the desired outward orientation.

In any event, in order for the three-dimensional modeling application 118 and/or the outer shell routine 120 to ultimately ensure proper orientation of all faces within the composite model (as further described below), the block 262 may ensure that faces within each individual sheet of the composite model are oriented consistently with one another. As described above, the orientation of a face, as indicated by a direction of a corresponding face normal, may be determined based on a plane equation corresponding to the face. By appropriately redefining the plane equation corresponding to a face, the direction of the face normal of a face may be reversed, thereby changing the orientation of the face from "outward" to "inward," or vice versa, without changing the appearance of the face. Accordingly, the block 262 may change the orientation of any face by appropriately redefining the corresponding plane equation so that for each sheet with more than one face, each face within that sheet is oriented consistently with each other face within that sheet. Redefinition of the plane equation corresponding to a face may be effectively accomplished by setting (or unsetting) a face reversal flag corresponding to the face.

In some embodiments, with regard to the sheet that includes the face satisfying criteria (i) and (ii) above, the block 262 may ensure consistent orientation of the faces within that sheet such that the face satisfying criteria (i) and (ii) above is oriented downward (i.e., in a negative direction with respect to the Z-axis). That is, because the face satisfying criteria (i) and (ii) above is the uppermost or highest face of the composite model, a downward orientation of this face is an "inward" orientation with respect to the rest of the composite model. In this manner, the block 262 may ensure that the uppermost face of the composite model represents a boundary of a solid object instead of a boundary of a void. Thus, in the event that the face satisfying criteria (i) and (ii) is oriented upward, the block 262 may reorient that face to have a downward orientation, such as by setting an appropriate face reversal flag(s). Then, in the event that any other face on the same sheet has an orientation inconsistent with this downward orientation, the block 262 may reorient any such face accordingly.

At a block 266, a boundary edge of the sheet that includes the face determined to have the greatest Z-coordinate and be most normal to the Z-axis may be identified. Of course, in embodiments where the block 254 is omitted, the block 266 may simply identify a boundary edge of the face determined to have the greatest Z-coordinate and be most normal to the Z-axis, and may similarly perform the subsequent operations described herein with respect to individual faces instead of individual sheets. In any event, in one embodiment, the block 220 of the outer shell routine 120 may store indications of all boundary edges, and the faces to which they correspond, when faces of the composite model are split based on face-face intersections. By reference to the grouping of faces into sheets by the block 254, the outer shell routine 120 may then determine a correspondence of boundary edges to sheets, if desired. As will be understood, some boundary edges of faces may not be boundary edges of their corresponding sheets. In this manner, fewer boundary edges may be considered in the outer shell calculations that follow without compromising the accuracy of such calculations.

The block 266 may select one of the boundary edges corresponding to the sheet containing the face that has the greatest Z-coordinate and is most normal to the Z-axis in any suitable manner. For example, the selection of a particular boundary edge may be arbitrary, or may be based on the coordinates of the particular boundary edge, etc.

At a block 270, a face that shares at least a portion of the boundary edge selected by the block 266 with the sheet identified by the block 258, and that is also located on the outer shell of the composite model, may be identified. Because two faces belong to a common sheet if the two faces share a common boundary edge that does not bound any other faces, a boundary edge of a sheet will bound at least two other faces. That is, more than one face will share at least a portion of the identified boundary edge with the sheet that contains the face initially identified by the block 258. Thus, the block 270 will determine which such face sharing the identified boundary edge is on the outer shell of the composite model, and which such face(s) sharing the identified boundary edge is/are inside the outer shell and can be removed by the outer shell routine 120.

More particularly, the block 270 may determine that the face sharing at least a portion of the identified boundary edge with the first sheet identified as being on the outer shell (i.e., by the block 258), and lying at the smallest angle thereto, is also on the outer shell. More particularly, in this example, an angle between the first sheet and another face is determined as the angle between the first sheet and the other face as measured in a direction toward the outside of the composite model, and may also be referred to as the "exterior angle" between the first sheet and the other face. The exterior angle may be identified, for example, by reference to the orientations of the faces of the sheet identified by the block 258, which orientations may have been set to "inward" by the block 262. Of course, the angle as measured in the direction nearest the inside of the composite model may be used instead with suitable modifications to the outer shell routine 120, if desired.

The block 270 may determine which face sharing the boundary edge with the sheet identified by the block 258 has the smallest angle to the sheet identified by the block 258 by performing suitable dot product operations using the normal vectors of (i) the sheet identified by the block 258 and (ii) each successive one of the faces sharing the boundary edge with the sheet identified by the block 258. Of course, in other examples, the block 270 may employ any other suitable method of determining which face sharing a boundary edge with the sheet identified by the block 258 forms the smallest angle with the sheet identified by the block 258. In any event, the face that shares the boundary edge and has the smallest angle to the sheet identified by the block 258 may be determined to be on the outer shell, and the face or faces that share the boundary edge but do not have the smallest angle to the sheet identified by the block 258 may then be determined to be inside the outer shell.

For example, with reference to FIG. 8, the block 258 may determine that the face 706 has the greatest Z-coordinate and is most normal to the Z-axis, and that the sheet containing the face 706 also contains the faces 708 and 716. The block 266 of the outer shell routine 120 may identify a particular boundary edge of the sheet containing the faces 706, 708, and 716, such as a boundary edge 720. The block 270 may determine, based on groupings of faces into sheets by the block 254, that the faces 704 and 712 share the boundary edge 720 with the sheet containing the faces 706, 708, and 716. The block 270 may then perform suitable dot product operations in order to determine that of the faces 704 and 712, the face 704 has a smaller angle to the sheet containing the faces 706, 708, and 716 and, therefore, that the face 704 is on the outer shell of the example composite model 700 and the face 712 is on the interior of the example composite model 700. This result may be understood by inspection of FIG. 8, which shows that the face 712 (shown in dashed lines) is on the interior of the composite model 700.

At a block 274, the sheet(s) containing the face(s) that were determined by the block 270 to be "inside" the outer shell may be removed from the composite model, thereby advantageously eliminating unnecessary or undesired details regarding the interior of the model. The sheet(s) containing the face(s) determined to be inside the outer shell may be determined based on a result of the block 254. Of course, in other embodiments where the block 254 is omitted, the block 274 may simply remove the face or faces determined by the block 270 to be inside the outer shell.

At a block 278, the sheet that includes the face identified by the block 270 as being on the outer shell may be identified and merged with the sheet identified by the block 258. In other words, a single sheet may now be defined to encompass both the sheet identified by the block 258 and the sheet that includes the face identified by the block 270. This single sheet may be referred to as the "resultant sheet." In some embodiments, the block 278 may include reorienting all of the faces of the sheet that includes the face identified by the block 270 so that the orientation of such faces is consistent with the orientation of the faces of the sheet identified by the block 258. For example, while the block 262 may have ensured consistent orientation of the faces of each individual sheet of the composite model, the orientations of faces of different sheets may be inconsistent in some cases. Accordingly, the block 278 may perform appropriate reorientation of faces of the sheet containing the face identified by the block 270, such as by setting and/or unsetting individual face reversal flags for the faces in that sheet.

At a block 282, it may be determined whether there are additional boundary edges between the resultant sheet and other faces of the composite model. For example, the outer shell routine 120 may use stored information from the operations performed by the block 220 to determine the locations of other faces and determine whether any other faces share a boundary edge with the resultant sheet. If it is determined by the block 282 that there are additional boundary edges, the flow may proceed to the block 266, in an embodiment. At the block 266, another boundary edge may be identified, such as in an arbitrary manner or another suitable manner as described above. In this manner, flow may then proceed to the block 270, where it may be determined which of the other faces sharing the newly identified boundary edge with the resultant sheet is also on the outer shell of the composite model and which face or faces sharing the newly identified boundary edge with the resultant sheet are on the interior of the composite model. Conversely, if at the block 282 it is determined that the resultant sheet does not have any more boundary edges with other faces that have not yet been considered by the blocks 266 and 270, the flow may proceed to a block 286.

At the block 286, it may be determined whether after the operations performed thus far, the composite model includes any more sheets that have not been considered. For example, while operations performed by the block 278 may ultimately yield a resultant sheet that does not have any more boundary edges with other sheets, and thus defines either a manifold volume or an open shell, the composite model may include additional sheets that are disjoint from the resultant sheet. As one example, the composite model may include additional sheets defining one or more shells that are "nested" with a shell defined by the resultant sheet. That is, where the resultant sheet defines a manifold volume (i.e., manifold shell), either that manifold shell or one of the shells defined by other (disjoint) sheets may completely contain each other one of the manifold shell defined by the resultant sheet and the one or more shells defined by the other disjoint sheets. As will be understood, when the block 258 identifies the face of the composite model that has the greatest Z-coordinate and is most normal to the Z-axis, the shell defined by the resultant sheet from the block 278 will be the shell that contains any other nested shells. In any event, in the case of nested shells, it may be desirable to identify and remove from the composite model any sheet defining a shell that is contained by another shell (i.e., an inner nested shell), because such a sheet will not be visible as part of the corresponding composite model from any exterior vantage point. In other examples, the composite model also or alternatively includes sheets defining one or more shells that are disjoint from a shell defined by the resultant sheet but not nested with the shell defined by the resultant sheet. That is, the interior(s) of such a disjoint shell(s) and the interior of the shell defined by the resultant sheet occupy distinct spaces. For example, a single composite model may include two disjoint shells that are not nested with one another in order to represent the exteriors of two separate, neighboring buildings. In such a situation, it may not be desirable to remove either of the disjoint shells from the composite model.

In any event, if the composite model includes any more sheets to be considered, the flow may proceed to the block 258, which may include determining an "uppermost" one of the sheets remaining to be considered. Subsequent operations of the outer shell routine 120 may then be performed for the additional sheets to be considered, thus effectively identifying "outer shells" defined by such additional sheets. Of course, in the case of nested shells, such "outer shells" defined by additional sheets may not be part of the desired final output of the outer shell routine 120, and may be ultimately removed as further described below. If, on the other hand, it is determined at the block 286 that the composite model does not include any more sheets to be considered, flow may proceed to a block 290.

At the block 290, it may be determined whether the composite model includes disjoint shells. In one embodiment, the block 290 may determine whether any implementation of the block 286 with respect to the composite model determined that more sheets were to be considered. If such a determination was made by the block 286, the composite model may be determined by the block 290 to include disjoint shells. In some embodiments, flow may then proceed to a block 294. If it was not determined by the block 286 that more sheets were to be considered, it may be determined by the block 290 that the composite model does not include disjoint shells. In that case, the method 250, and thus the method 200, may end. The method 200 and/or the method 250 may, of course, be repeated as needed or desired.

Figure 9A:
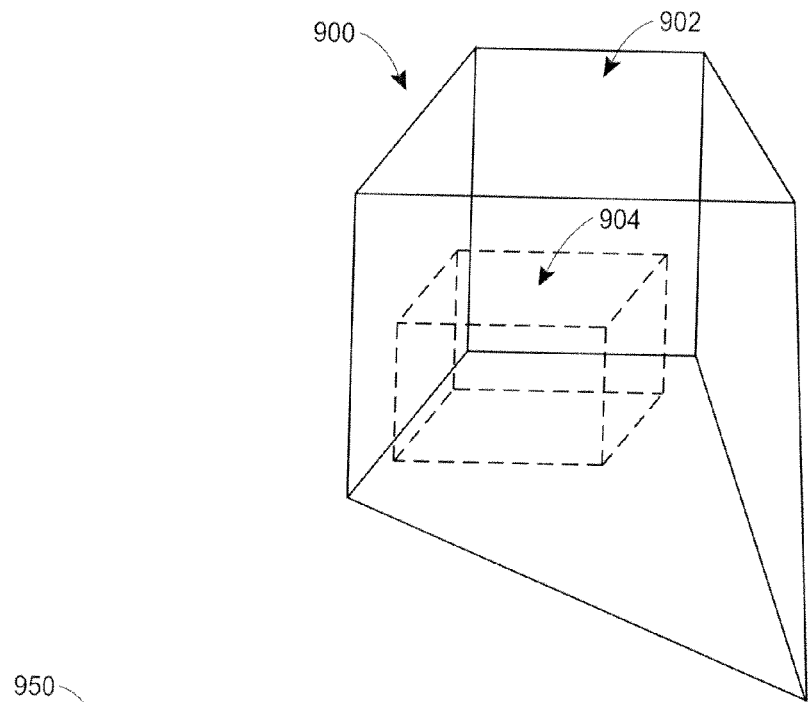
FIG. 9A illustrates an example composite model which, after certain operations performed by an outer shell routine, has a first manifold shell and a second manifold shell nested within the first manifold shell.

In the event that flow proceeds to the block 294, the block 294 may determine whether any of the disjoint shells are nested. For example, the block 294 may evaluate a single point of each shell remaining in the composite model to see whether that single point is contained by any other shells in the composite model. This evaluation may, be performed by, for example, implementing a "point within polyhedron" function, or in any other suitable manner. FIG. 9A illustrates an example composite model 900 which, after performing outer shell determining operations such as those described above, has a first manifold shell 902 and a second manifold shell 904 nested within the first manifold shell 902. As will be understood from FIG. 9A, use of a point within polyhedron function to evaluate any point on the second manifold shell 904 against the first manifold shell 902 will yield a result indicating that the point on the second manifold shell 904, and thus the entire second manifold shell 904, is contained within the first manifold shell 902. Conversely, use of a point within polyhedron function to evaluate any point on the first manifold shell 902 against the second manifold shell 904 will yield a result indicating that the point on the first manifold shell

902, and thus the entire first manifold shell 902, is outside the second manifold shell 904. In this manner, it may be determined that the sheets constituting the second manifold shell 904 are to be removed.

In the case of shells that are disjoint but not nested, use of a point within polyhedron function to evaluate a point on one of the shells against any other shell will yield, for each shell that is disjoint but not nested, a result indicating that the evaluated point is outside the shell against which the point was evaluated. In this manner, it may be determined that no sheets constituting such shells are to be removed, and that the output of the outer shell routine 120 is to include both/all of such disjoint shells. In the event that the block 294 determines that any nested shells are present in the composite model, flow may proceed to a block 298. In the event that the block 294 determines that no nested shells are present in the composite model, the method 250 may end.

Figure 9B:
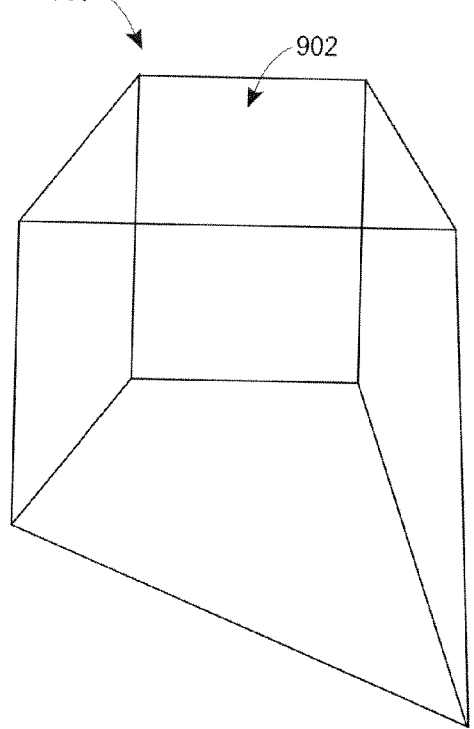
FIG. 9B illustrates an example updated composite model that includes only the first manifold shell of FIG. 9A after application of one or more additional operations of the outer shell routine to the example composite model of FIG. 9A.

At the block 298, any sheets defining interior nested shells may be removed. Thus, in one example, the block 298 may remove the second manifold shell 904 from the example composite model 900 of FIG. 9A, leaving an example updated composite model 950 that includes only the first manifold shell 902, as shown in FIG. 9B. The method 250 may then end.

Accordingly, the described embodiments allow a user of a three-dimensional modeling application to identify a composite model, such as by selecting desired three-dimensional objects for inclusion in the composite model, and then use the three-dimensional modeling application to determine an outer shell of the composite model and remove interior geometry from the composite model. In this manner, the appearance of the composite model from any exterior vantage point may be unchanged, but the computational resources required to represent, manipulate, etc. the composite model via the three-dimensional modeling application may be significantly reduced.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

For example, the three-dimensional modeling system 100 may include but is not limited to any combination of a LAN, a MAN, a WAN, a mobile network, a wired or wireless network, a private network, or a virtual private network. Moreover, while the computing device 101 and two remote computing devices 130 and 132 are illustrated in FIG. 1 to simplify and clarify the description, it is understood that any number of client computers are supported and can be in communication within the three-dimensional modeling system 100.

Additionally, while example implementations of the computing device 101 and the three-dimensional modeling system 100 are described herein, other types of processor systems and/or processor systems having different architectures than shown in the example three-dimensional modeling system 100 may be used to implement and execute the methods and features described herein. For example, although the example three-dimensional modeling system 100 is described as including a plurality of peripherals, interfaces, chips, memories, etc., one or more of those elements may be omitted from other example processor systems used to implement and execute the example three-dimensional modeling system 100. Additionally or alternatively, other suitable components not shown in the example three-dimensional modeling system 100 may be added as needed or desired.

Moreover, certain embodiments are described herein as including logic or a number of components, modules, or mechanisms. Modules may constitute either software modules (e.g., code embodied on a machine-readable medium or in a transmission signal, wherein the code is executed by a processor) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible non-transitory entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "identifying," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments," "an embodiment," or the like means that a particular element, feature, structure, or characteristic described in connection with the embodiment is included in at least one embodiment. The appearances of the phrase "in some embodiments" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of a system and method for eliminating interior geometry from a composite model in a three-dimensional modeling application for purposes of illustration only. One skilled in the art will readily recognize from the foregoing discussion that alternative embodiments of the structures and methods illustrated herein may be employed without departing from the principles described herein. Moreover, while various ones of the figures depict certain composite models and/or portions thereof, and/or certain three-dimensional objects and/or portions thereof, it will be understood that each of the figures is for purposes of example and illustration only, and that the various features of the disclosed embodiments may be applied to any suitable composite three-dimensional model that includes any suitable three-dimensional objects.

Upon reading this disclosure, those of skill in the art will appreciate still additional alternative structural and functional designs for a system and a method for eliminating interior geometry from a composite model in a three-dimensional modeling application through the disclosed principles herein.

Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the embodiments disclosed herein without departing from the spirit and scope defined in the appended claims.

What is claimed is:

1. A computer-implemented method of determining an outer shell of a composite three-dimensional model, the computer-implemented method comprising:
    receiving, using a computing device, an indication of a plurality of initial faces of the composite three-dimensional model;
    determining, using the computing device, a plurality of intersections between the plurality of initial faces of the composite three-dimensional model;
    generating, using the computing device, a plurality of split faces by splitting each of the plurality of initial faces that intersects another one or more of the plurality of initial faces into two or more split faces along one or more lines of intersection between the initial face and the other one or more of the plurality of initial faces; and
    determining, using the computing device, whether each of the plurality of split faces and each of the plurality of initial faces that does not intersect another one or more of the plurality of initial faces corresponds to the outer shell of the composite three-dimensional model or to an interior portion of the composite three-dimensional model, wherein determining whether each of the plurality of split faces and each of the plurality of initial faces that does not intersect another one or more of the plurality of initial faces corresponds to the outer shell of the composite three-dimensional model or to the interior portion of the composite three-dimensional model includes:
        identifying, using the computing device, a portion of the outer shell based on identifying one of the plurality of split faces or one of the plurality of initial faces that, of one or more faces having a highest coordinate along one of a plurality of coordinate axes, is a face most normal to the one coordinate axis; and
        determining, using the computing device, a further one of the plurality of split faces or a further one of the plurality of initial faces that shares a first boundary edge with the identified portion of the outer shell and that corresponds to the outer shell based on an angle between the identified portion of the outer shell and the further one of the plurality of split faces or the further one of the plurality of initial faces;
        removing from the composite three-dimensional model, using the computing device, one or more other faces that share the first boundary edge with the identified portion of the outer shell;
        updating, using the computing device, the identified portion of the outer shell based on the determining of the further one of the plurality of split faces or the further one of the plurality of initial faces that corresponds to the outer shell; and
        identifying, using the computing device, a further boundary edge of the identified portion of the outer shell after updating the identified portion of the outer shell.

2. The computer-implemented method of claim 1, wherein determining the plurality of intersections between the plurality of initial faces includes:
    sorting, using the computing device, a plurality of three-dimensional objects of the composite three-dimensional model according to a minimum coordinate associated with each of the plurality of three-dimensional objects, each of the plurality of three-dimensional objects including a subset of the plurality of initial faces of the composite three-dimensional model;
    determining, using the computing device, a plurality of pairs of the plurality of three-dimensional objects based on the sorting of the plurality of three-dimensional objects; and
    determining, using the computing device, for each pair of the plurality of three-dimensional objects, whether any of the initial faces of a first three-dimensional object of the pair intersect any of the initial faces of a second three-dimensional object of the pair.

3. The computer-implemented method of claim 1, wherein determining whether each of the plurality of split faces and each of the plurality of initial faces that does not intersect another one or more of the plurality of initial faces corresponds to the outer shell of the composite three-dimensional model or to the interior portion of the composite three-dimensional model includes repeating, using the computing device, the determining of a further one of the plurality of split faces or a further one of the plurality of initial faces that corresponds to the outer shell, the updating of the identified portion of the outer shell, and the identifying of a further boundary edge of the identified portion of the outer shell until no boundary edge remains between the identified portion of the outer shell and any further one of the plurality of split faces and the plurality of initial faces.

4. The computer-implemented method of claim 3, wherein identifying the portion of the outer shell includes identifying, using the computing device, the portion of the outer shell as the one of the plurality of split faces or the one of the plurality of initial faces that, of the one or more faces having the highest coordinate along the one coordinate axis, is the face most normal to the one coordinate axis.

5. The computer-implemented method of claim 3, wherein identifying the portion of the outer shell includes:
    identifying as being included in the portion of the outer shell, using the computing device, the one of the plurality of split faces or the one of the plurality of initial faces that, of the one or more faces having the highest coordinate along the one coordinate axis, is the face most normal to the one coordinate axis; and
    identifying as being included in the portion of the outer shell, using the computing device, one or more additional ones of the plurality of split faces and the plurality of initial faces,
    wherein each of one or more boundary edges between the faces identified as being included in the portion of the outer shell bounds only two of the faces identified as being included in the portion of the outer shell.

6. The computer-implemented method of claim 3, further comprising:
    determining, using the computing device, whether the one of the plurality of split faces or the one of the plurality of initial faces that, of the one or more faces having the highest coordinate along the one coordinate axis, is the face most normal to the one coordinate axis, is oriented in a positive direction with respect to the one coordinate axis or a negative direction with respect to the one coordinate axis; and reversing, using the computing device, the orientation of the one of the plurality of split faces or the one of the plurality of initial faces when it is determined that the orientation of the one of the plurality of split faces or the one of the plurality of initial faces is in the positive direction with respect to the one coordinate axis.

7. The computer-implemented method of claim 6, further comprising:
determining, using the computing device, an orientation of each further one of the plurality of split faces or the plurality of initial faces that is determined to correspond to the outer shell; and
reversing, using the computing device, the orientation of each further one of the plurality of split faces or the plurality of initial faces that is determined to correspond to the outer shell when it is determined that the orientation of the further one of the plurality of split faces or the plurality of initial faces is inconsistent with the orientation of the one of the plurality of split faces or the one of the plurality of initial faces.

8. A computer-implemented method for use in determining an outer shell of a composite three-dimensional model comprising a plurality of faces, the computer-implemented method comprising:
identifying, using a computing device, a first subset of the plurality of faces that share a common boundary edge, wherein identifying the first subset of the plurality of faces that share the common boundary edge includes:
identifying a first face of the first subset, using the computing device, based on identifying one of the plurality of faces that, of one or more of the plurality of faces having a highest coordinate along one of a plurality of coordinate axes, is a face most normal to the one coordinate axis; and
identifying as part of the first subset, using the computing device, at least two of the plurality of faces that share the common boundary edge with the first face of the first subset;
determining, using the computing device, two of the first subset of the plurality of faces that correspond to the outer shell of the composite three-dimensional model based on an angle between the two of the first subset of the plurality of faces; and
removing, using the computing device, at least one other one of the first subset of the plurality of faces from the composite three-dimensional model based on determining that the two of the first subset of the plurality of faces correspond to the outer shell of the composite three-dimensional model.

9. The computer-implemented method of claim 8, further comprising:
identifying, using the computing device, one or more further subsets of the plurality of faces that share one or more respective further common boundary edges; and
determining, using the computing device, for each further subset of the plurality of faces, one face of the further subset that corresponds to the outer shell of the composite three-dimensional model based on an angle between the one face of the further subset and one of the plurality of faces previously determined to correspond to the outer shell of the composite three-dimensional model.

10. The computer-implemented method of claim 8, further comprising:
identifying, using the computing device, a sheet including one of the plurality of faces that, of the one or more of the plurality of faces having the highest coordinate along the one coordinate axis, is the face most normal to the one coordinate axis, the sheet further including one or more additional ones of the plurality of faces such that each of one or more boundary edges between faces of the sheet bounds only two faces of the sheet,
wherein identifying the first face of the first subset includes identifying, using the computing device, a face of the sheet including at least a portion of an edge of the sheet, wherein the at least the portion of the edge of the sheet is the common boundary edge.

11. The computer-implemented method of claim 10, wherein determining the two of the first subset of the plurality of faces that correspond to the outer shell includes:
determining, using the computing device, that the first face of the first subset corresponds to the outer shell; and
determining, using the computing device, that a second face of the first subset corresponds to the outer shell by determining that an exterior angle between the first face and the second face is smaller than one or more exterior angles between one or more respective other pairs of the first subset of the plurality of faces.

12. The computer-implemented method of claim 8, wherein the plurality of faces of the composite three-dimensional model is a plurality of updated faces, the computer implemented method further comprising identifying the plurality of updated faces by:
determining, using the computing device, a plurality of intersections between a plurality of initial faces of the composite three-dimensional model;
dividing, using the computing device, each of the plurality of initial faces that intersects one or more other ones of the plurality of initial faces into two or more faces of the plurality of updated faces by splitting the initial face along one or more lines of intersection between the initial face and the one or more other ones of the plurality of initial faces; and
including in the plurality of updated faces, using the computing device, each of the plurality of initial faces that does not intersect another one or more of the plurality of initial faces.

13. A tangible non-transitory computer-readable medium having instructions stored thereon that, when executed by one or more processors, cause the one or more processors to:
receive an indication of a plurality of initial faces of a composite three-dimensional model;
determine a plurality of intersections between the plurality of initial faces of the composite three-dimensional model;
generate a plurality of split faces by splitting each of the plurality of initial faces that intersects another one or more of the plurality of initial faces into two or more split faces along one or more lines of intersection between the initial face and the other one or more of the plurality of initial faces; and
determine whether each of the plurality of split faces and each of the plurality of initial faces that does not intersect another one or more of the plurality of initial faces corresponds to an outer shell of the composite three-dimensional model or to an interior portion of the composite three-dimensional model, wherein the instructions cause the one or more processors to:
identify a portion of the outer shell based on identifying one of the plurality of split faces or one of the plurality of initial faces that, of one or more faces having a highest coordinate along one of a plurality of coordinate axes, is a face most normal to the one coordinate axis; and determine a further one of the plurality of split faces or a further one of the plurality of initial faces that shares a first boundary edge with the identified portion of the outer shell and that corresponds to the outer shell based on an angle between the identified portion of the outer shell and the further one of the plurality of split faces or the further one of the plurality of initial faces;

remove from the composite three-dimensional model one or more other faces that share the first boundary edge with the identified portion of the outer shell;

update the identified portion of the outer shell based on the determining of the further one of the plurality of split faces or the further one of the plurality of initial faces that corresponds to the outer shell; and identify a further boundary edge of the identified portion of the outer shell after updating the identified portion of the outer shell.

14. The tangible non-transitory computer-readable medium of claim 13, wherein the instructions that cause the one or more processors to determine the plurality of intersections between the plurality of initial faces of the composite three-dimensional model include instructions that cause the one or more processors to:

sort a plurality of three-dimensional objects of the composite three-dimensional model according to a minimum coordinate associated with each of the plurality of three-dimensional objects, each of the plurality of three-dimensional objects including a subset of the plurality of initial faces of the composite three-dimensional model;

determine a plurality of pairs of the plurality of three-dimensional objects based on the sorting of the plurality of three-dimensional objects; and determine, for each pair of the plurality of three-dimensional objects, whether any of the initial faces of a first three-dimensional object of the pair intersect any of the initial faces of a second three-dimensional object of the pair.

15. The tangible non-transitory computer-readable medium of claim 13, wherein the instructions that cause the one or more processors to determine whether each of the plurality of split faces and each of the plurality of initial faces that does not intersect another one or more of the plurality of initial faces corresponds to the outer shell of the composite three-dimensional model or to the interior portion of the composite three-dimensional model include instructions that cause the one or more processors to repeat the determining of a further one of the plurality of split faces or a further one of the plurality of initial faces that corresponds to the outer shell, the updating of the identified portion of the outer shell, and the identifying of a further boundary edge of the identified portion of the outer shell until no boundary edge remains between the identified portion of the outer shell and any further one of the plurality of split faces and the plurality of initial faces.

16. The tangible non-transitory computer-readable medium of claim 15, wherein the instructions that cause the one or more processors to identify the portion of the outer shell include instructions that cause the one or more processors to identify the portion of the outer shell as the one of the plurality of split faces or the one of the plurality of initial faces that, of the one or more faces having the highest coordinate along the one coordinate axis, is the face most normal to the one coordinate axis.

17. The tangible non-transitory computer-readable medium of claim 15, wherein the instructions that cause the one or more processors to identify the portion of the outer shell include instructions that cause the one or more processors to:

identify, as being included in the portion of the outer shell, the one of the plurality of split faces or the one of the plurality of initial faces that, of the one or more faces having the highest coordinate along the one coordinate axis, is the face most normal to the one coordinate axis; and identify, as being included in the portion of the outer shell, one or more additional ones of the plurality of split faces and the plurality of initial faces, wherein each of one or more boundary edges between the faces identified as being included in the portion of the outer shell bounds only two of the faces identified as being included in the portion of the outer shell.

18. The tangible non-transitory computer-readable medium of claim 15, further having instructions stored thereon that, when executed by the one or more processors, cause the one or more processors to:

determine whether the one of the plurality of split faces or the one of the plurality of initial faces that, of the one or more faces having the highest coordinate along the one coordinate axis, is the face most normal to the one coordinate axis, is oriented in a positive direction with respect to the one coordinate axis or a negative direction with respect to the one coordinate axis; and reverse the orientation of the one of the plurality of split faces or the one of the plurality of initial faces when it is determined that the orientation of the one of the plurality of split faces or the one of the plurality of initial faces is in the positive direction with respect to the one coordinate axis.

19. The tangible non-transitory computer-readable medium of claim 18, further having instructions stored thereon that, when executed by the one or more processors, cause the one or more processors to:

determine an orientation of each further one of the plurality of split faces or the plurality of initial faces that is determined to correspond to the outer shell; and reverse the orientation of each further one of the plurality of split faces or the plurality of initial faces that is determined to correspond to the outer shell when it is determined that the orientation of the further one of the plurality of split faces or the plurality of initial faces is inconsistent with the orientation of the one of the plurality of split faces or the one of the plurality of initial faces.

20. A tangible non-transitory computer-readable medium having instructions stored thereon that, when executed by one or more processors, cause the one or more processors to:

identify a first subset of a plurality of faces of a composite three-dimensional model that share a common boundary edge, wherein the instructions cause the one or more processors to:

identify a first face of the first subset based on identifying one of the plurality of faces that, of one or more of the plurality of faces having a highest coordinate along one of a plurality of coordinate axes, is a face most normal to the one coordinate axis; and identify, as part of the first subset, at least two of the plurality of faces that share the common boundary edge with the first face of the first subset;

determine two of the first subset of the plurality of faces that correspond to an outer shell of the composite three-dimensional model based on an angle between the two of the first subset of the plurality of faces; and remove at least one other one of the first subset of the plurality of faces from the composite three-dimensional model based on determining that the two of the first subset of the plurality of faces correspond to the outer shell of the composite three-dimensional model.

21. The tangible non-transitory computer-readable medium of claim 20, further having instructions stored thereon that, when executed by the one or more processors, cause the one or more processors to:

identify one or more further subsets of the plurality of faces that share one or more respective further common boundary edges; and determine, for each further subset of the plurality of faces, one face of the further subset that corresponds to the outer shell of the composite three-dimensional model based on an angle between the one face of the further subset and one of the plurality of faces previously determined to correspond to the outer shell of the composite three-dimensional model.

22. The tangible non-transitory computer-readable medium of claim claim 20, further having instructions stored thereon that, when executed by the one or more processors, cause the one or more processors to:

identify a sheet including the one of the plurality of faces that, of the one or more of the plurality of faces having the highest coordinate along the one coordinate axis, is the face most normal to the one coordinate axis, the sheet further including one or more additional ones of the plurality of faces such that each of one or more boundary edges between faces of the sheet bounds only two faces of the sheet, wherein the instructions that cause the one or more processors to identify the first face of the first subset include instructions that cause the one or more processors to identify a face of the sheet including at least a portion of an edge of the sheet, wherein the at least the portion of the edge of the sheet is the common boundary edge.

23. The tangible non-transitory computer-readable medium of claim 22, wherein the instructions that cause the one or more processors to determine the two of the first subset of the plurality of faces that correspond to the outer shell include instructions that cause the one or more processors to:

determine that the first face of the first subset corresponds to the outer shell; and determine that a second face of the first subset corresponds to the outer shell by determining that an exterior angle between the first face and the second face is smaller than one or more exterior angles between one or more respective other pairs of the first subset of the plurality of faces.

24. The tangible non-transitory computer-readable medium of claim 20, wherein the plurality of faces of the composite three-dimensional model is a plurality of updated faces, the tangible non-transitory computer-readable medium further having instructions stored thereon that, when executed by the one or more processors, cause the one or more processors to:

determine a plurality of intersections between a plurality of initial faces of the composite three-dimensional model;

divide each of the plurality of initial faces that intersects one or more other ones of the plurality of initial faces into two or more faces of the plurality of updated faces by splitting the initial face along one or more lines of intersection between the initial face and the one or more other ones of the plurality of initial faces; and include in the plurality of updated faces each of the plurality of initial faces that does not intersect another one or more of the plurality of initial faces.

* * * * *